United States Patent
Roy et al.

(10) Patent No.: US 7,331,850 B2
(45) Date of Patent: Feb. 19, 2008

(54) LOIN PULLER WITH TWO SEPARATE CUTTING BLADES

(75) Inventors: Jean-Guy Roy, Saint-Anselme (CA); Yvon Dufour, Saint-Anselme (CA)

(73) Assignee: G.E. LeBlanc Inc., St-Anselme, Québec (CA)

( * ) Notice: Subject to any disclaimer, the term of this patent is extended or adjusted under 35 U.S.C. 154(b) by 0 days.

(21) Appl. No.: 11/642,519

(22) Filed: Dec. 21, 2006

(65) Prior Publication Data
US 2007/0184767 A1 Aug. 9, 2007

Related U.S. Application Data

(63) Continuation-in-part of application No. 11/074,795, filed on Mar. 9, 2005, now Pat. No. 7,214,129.

(30) Foreign Application Priority Data
Mar. 10, 2004 (CA) .................... 2460547

(51) Int. Cl.
*A22C 18/00* (2006.01)
(52) U.S. Cl. .................................... 452/171
(58) Field of Classification Search ............... 452/134, 452/136, 150, 156, 157, 125, 127–130, 148, 452/170, 171, 169
See application file for complete search history.

(56) References Cited

U.S. PATENT DOCUMENTS

| | | | | |
|---|---|---|---|---|
| 4,557,014 A | * | 12/1985 | Vogt | 452/151 |
| 4,970,755 A | * | 11/1990 | Leblanc | 452/134 |
| 5,009,939 A | * | 4/1991 | Goldberg | 428/34.2 |
| 5,226,850 A | * | 7/1993 | Klaassen | 452/171 |
| 5,334,084 A | * | 8/1994 | O'Brien et al. | 452/157 |
| 5,580,306 A | * | 12/1996 | Young et al. | 452/171 |
| 6,089,968 A | * | 7/2000 | Andre et al. | 452/171 |
| 6,155,919 A | * | 12/2000 | Haagensen et al. | 452/171 |
| 6,336,856 B1 | * | 1/2002 | Dufour et al. | 452/171 |
| 6,547,658 B2 | * | 4/2003 | Boody et al. | 452/171 |

* cited by examiner

*Primary Examiner*—Thomas Price
(74) *Attorney, Agent, or Firm*—ROBIC (57) ABSTRACT

Disclosed is a loin puller for trimming off the backfat of a loin that has been scribed from a belly. This loin puller has a frame on which is mounted a conveying system for engaging the loin and moving it towards a cutting zone. In this zone, a cutting tool is mounted for engaging the loin when it is moved by the conveying system, and for cutting the backfat to be trimmed off from the loin, with the so-cut backfat remaining attached to the belly. The cutting tool has two blades that are preferably controlled independently from each other. One of these blades is arcuate and positioned onto the frame so as to engage at least one part of the loin from a side of the loin opposite to the belly, and to cut the backfat to be trimmed from the loin. The other blade is L-shaped and positioned onto the frame so as to engage another part of the loin and cut the backfat to be trimmed thereof directly from the scribing line just below the back ribs of the loin. The two blades are long enough to ensure that all the backfat of the loin be trimmed off. Advantageously, the arcuate blade has one end pivotably attached to the frame by a joint and another opposite end attached either to the frame or the L-shaped blade. The use of such a joint gives much more flexibility of the arcuate blade and makes it much more efficient.

18 Claims, 8 Drawing Sheets

LOIN PULLER WITH TWO SEPARATE CUTTING BLADES

CROSS REFERENCE

The present application is a continuation-in-part of application Ser. No. 11/074,795 filed on Mar. 9, 2005 now U.S. Pat. No. 7,214,129 with the benefit of the priority of Canadian patent application No. 2,460,547 filed on Mar. 10, 2004.

FIELD OF THE INVENTION

The present invention relates to a loin puller of improved structure, which comprises a cutting tool having two blades instead of one only, in order to trim off the backfat from a loin while leaving the so cut backfat attached to the belly.

BACKGROUND OF THE INVENTION

Loin pullers are well known machines used in the meat processing industry for trimming off the backfat of a loin, in particular a pork loin.

Figure 1:
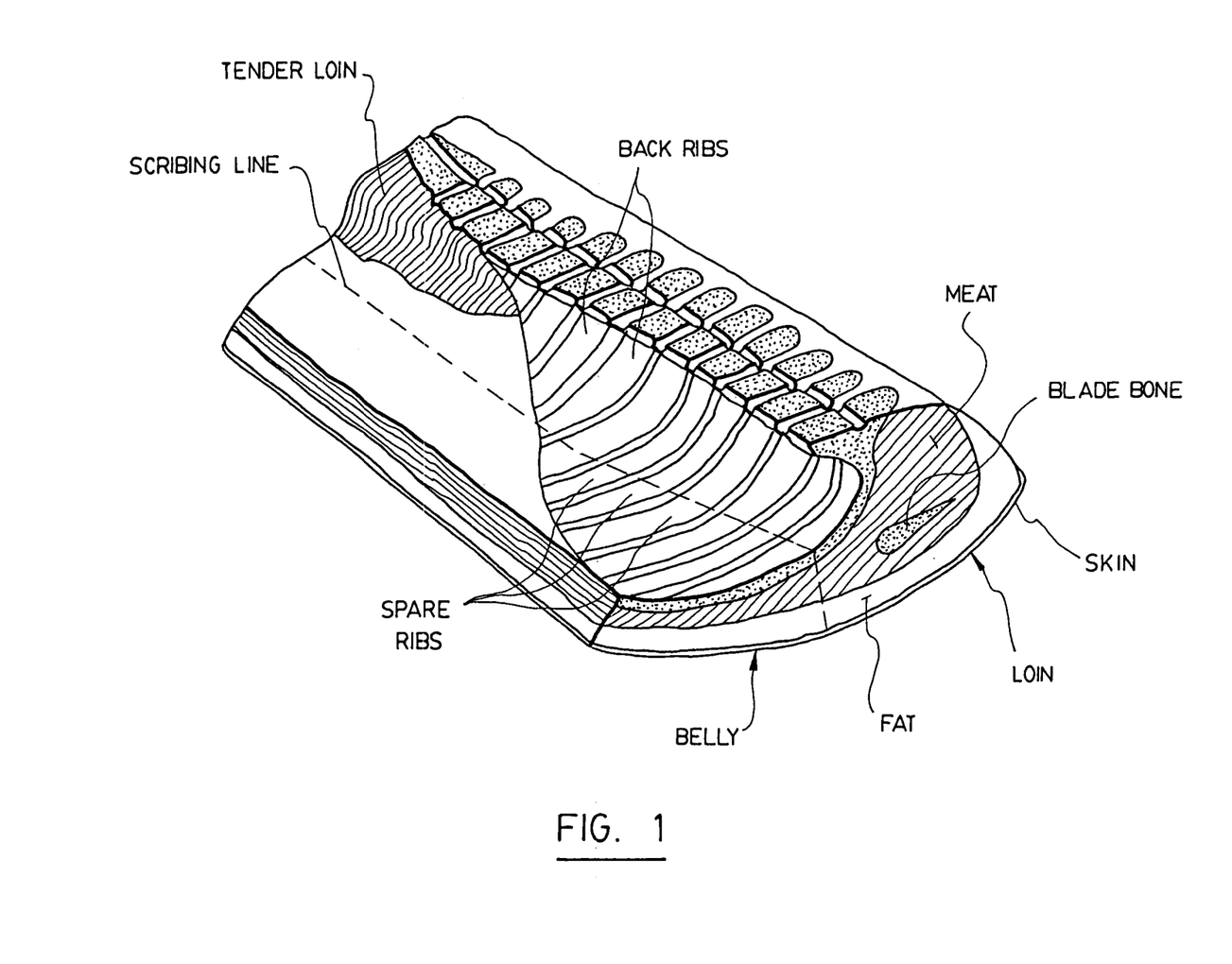
FIG. 1 is a perspective view of a carcass-half showing the main parts of it, as they have been disclosed hereinabove in the "Background of the invention".

As shown in FIG. 1 of the accompanying drawings, the central part or "middle" of the carcass-half of a piece of meat comprises two main parts respectively called "loin" and "belly". The loin is adjacent to the cut portion of the spinal column. The front portion of the loin contains ribs which are called "back ribs". The belly which is also called "flank", is a part which is adjacent to the loin at the opposite of the spinal column. The ends of the ribs which extend along the belly can altogether be separated from the same to form "spare ribs", or they can be removed individually. After removal of the ribs, the belly is mainly used to prepare bacon. The whole carcass-half is covered by an external layer of fat which extends under the loin and belly. The thickness of this layer of fat depends on several parameters including, inter alia, the size, the origin and the nutrition of the animal. This fat is the one that can be found in bacon. Therefore, it is important from a practical standpoint to keep a proper amount of fat with the belly prior to cutting the same.

However, it is important to remove some of the fat extending under the loin to avoid an over load of fat in the final product and have to call for an extra manpower or a complementary equipment to remove this fat if it has not been removed from the loin in the loin puller.

Prior to processing a loin in a loin puller, it is of course necessary to separate it from the belly. So far, there have been two different methods of doing so.

The first method, called "Canadian cut", consists in completely separating the belly from the loin by completely cutting the carcass-half according to a suitable cutting line which may vary depending on the need. An example of such a cutting line is shown in dotted lines in FIG. 1. Such a cutting can be carried out either manually or by means of another machine located upstream the loin puller or within the same. Once separated, the belly can be directed towards another machine or another working table specially adapted for this purpose, in order to separate the spare ribs. On the other hand, the loin is introduced into the loin puller, in order to trim off its fat.

As a non-limitative example of a loin puller especially adapted to process loins after full separation from the adjacent bellies, reference can be made to U.S. Pat. No. 5,090,939 issued on Feb. 25, 1992 in the name of the Applicant, G.E. LEBLANC INC.

The second method called "American cut", consists in cutting (scribing) only the internal part of the carcass-half, that is the upper part of the carcass-half shown in FIG. 1, following the same type of cutting line as above, except for the fat. As a result, the layer of fat remains uncut and maintains altogether the loin and the belly. Then, both of them may be transferred together to a working table where the loin is separated from the belly while leaving some of the loin fat attached to the belly. The main advantage of this method is that it makes it possible to recover part of the fat and meat of the loin together with the belly, which part would otherwise have been left onto the loin and trimmed off by a cutting blade. Usually, this method of processing carcass-halves is carried out manually, even though industrial machines have been proposed to do it.

As a non-limitative example of a loin puller adapted to process loins not fully separated from the adjacent bellies, reference can be made to U.S. Pat. No. 6,336,856 issued on Jan. 8, 2002 also in the name of G.E. LEBLANC INC.

In all the existing loin pullers whatever be their kinds of cut, viz. Canadian or American ones, it is of common practice to use an arcuate cutting blade mounted above the loin conveying system in order to engage the loin while the same is moved forwards, and to cut the layer of fat to be trimmed off from the same, with or without lean meat on the trimmed fat attached to the belly. The arcuate cutting blade is of course "associated" to a control system whose purpose is to adjust the height and curvature of the blade as a function of the size, shape and other characteristics of the loin to be processed, especially the thickness of the layer of fat to be trimmed off. This control system can be operated manually or it can be operated by an automatic measurement system which evaluates the main parameters required for adjusting the cutting blade as a function of the evaluation of the main parameters from trimming off the loin. For further details on this kind of automation, reference can be made by way of non-restrictive examples to the description of the above mentioned U.S. Pat. No. 5,090,939.

In order to maximize yields on bellies as compared to what is achieved when use is made of a conventional arcuate cutting blade, it has already been suggested to use an arcuate cutting blade having a distorted portion (also called "inwardly projecting bend" or "indented bight") on one of its sides. In this connection, reference can be made to the above mentioned U.S. Pat. No. 6,336,856 to G.E. LEBLANC INC., as well as to U.S. Pat. No. 6,155,919 issued on Dec. 5, 2000 to SWIFT & CO. and U.S. Pat. No. 6,089,968 issued on Jul. 18, 2000 to ACRALOC CORP. Reference can also be made to U.S. Pat. No. 6,547,658 issued on Apr. 15, 2003 to ACRALOC CORP., which discloses a loin puller comprising two blades extending vertically within the conveyor, one of said blades being Z-shaped to fully separate the loin from the belly while leaving lean fingers on the belly to increase the exposed amount of lean meat on the backfat side of the belly, the other one of said blades being J-shaped to trim off the fat and skin from the loin after it has been separated from the belly.

In all above-mentioned cases, the utility and advantage of the distorted portion of the blade is to allow trimming off of the loin close to the ribs while leaving lean fingers of meat on the belly.

It is worth noting however that there is a basic difference between the way the arcuate cutting blade with a distorted portion disclosed in G.E. LEBLANC's U.S. Pat. No. 6,336,856 is used and the way the blade disclosed in the three other patents mentioned hereinabove, is used. In G.E. LEBLANC's U.S. Pat. No. 6,336,856, the arcuate cutting blade is exclusively used to trim off the fat and skin (also called "backfat") from the back of the loin while simultaneously leaving fingers of meat on the belly. The arcuate cutting blade separates the loin from the central part of the carcass half but it does not separate the fat and skin trimmed off from the loin from the adjacent belly. In full contrast, in SWIFT & CO's U.S. Pat. No. 6,155,919 and ACRALOC CORP.'s U.S. Pat. Nos. 6,089,968 and 6,547,658, the arcuate cutting blade(s) is (are) used to fully separate not only the loin itself but also its fat and skin from the belly while leaving fingers of meat on the same. In U.S. Pat. Nos. 6,155,919 and 6,089,968, a single cutter blade is used just to separate the loin from the belly while leaving the skin and fat intact on the back of the loin (see and compare FIGS. 2 and 3 of U.S. Pat. No. 6,155,919 and FIGS. 18 and 19 of U.S. Pat. No. 6,089,968 and the corresponding parts of their specification). In U.S. Pat. No. 6,547,658, another blade is used to trim off the fat and skin from the loin. However, even if the fat and skin are trimmed off from the loin, the fat and skin are also separated from the belly either at the same time or just before.

If arcuate cutting blades with a distorted portion are interesting for the above mentioned reason, they have the drawback of being very difficult to make in one piece with an appropriate and efficient sharpened edge. Thus, in practice, the requested cutting especially close to the ribs without risk of hitting them and also hitting the blade bone, is quite difficult to be achieved with good results, especially in the case where, like in G.E. LEBLANC's loin puller, the arcuate part of the cutting blade is mainly used to separate the loin from the belly while trimming off the fat and skin from the loin and leaving them attached to the adjacent belly.

SUMMARY OF THE INVENTION

It has now been found that one may solve the above mentioned problem encountered in a loin puller having an arcuate cutting blade with a distorted portion, can be solved if use is made of such an arcuate cutting blade in combination with another cutting blade separate from the arcuate cutting blade for the purpose of cutting the loin close to the ribs to leave lean fingers of meat on the belly prior to further processing the loin to trim off the fat and skin (also called "backfat") from its back while leaving them attached to the adjacent belly.

It has been also found that the cutting is improved if the arcuate cutting blade has one of its ends pivotably connected to the frame-by means of a joint.

Thus, the present invention is directed to an improved loin puller for trimming off the backfat of a loin that has been scribed from a belly along a scribing line, the loin comprising backribs adjacent to the scribing line. This improved loin puller basically comprises:

a frame;

a conveying system mounted onto the frame for engaging the loin and moving it towards a cutting zone; and a cutting tool mounted onto the frame in the cutting zone for engaging the loin when said loin is moved by the conveying system and for cutting the backfat to be trimmed off from the loin, with the so-cut backfat remaining attached to the belly, In accordance with the invention, the cutting tool comprises two blades. One of these blades is arcuate and positioned onto the frame so as to engage at least one part of the loin from a side of the loin opposite to the belly and to cut the backfat to be trimmed from this part. The other one of these blades is L-shaped and positioned onto the frame so as to engage another part of the loin and cut the backfat to be trimmed directly from the scribing line just below the back ribs of the loin.

In accordance with the invention, the arcuate blade also has one end pivotably attached to the frame by a joint, and another opposite end attached either to the frame or the L-shaped blade. The use of such a joint gives much more flexibility of the arcuate cutting blade and makes it more efficient. Preferably, the joint is a double hinge joint comprising a link having ends pivotably connected to the frame and to arcuate cutting blade, respectively.

As may be appreciated, the invention is thus directed to an independent dual blade loin puller that is devised to keep the backfat portion of the loin intact and attached to the belly after the loin has been separated.

The capability of keeping the backfat attached to the belly portion after separation of the loin is very important for getting the maximal yields from the three parts of the middle, namely the belly, the loin and the backfat. In practice, the separation line between the belly and the backfat is depending on multiple belly criteria which can be evaluated only after removing the loin, such as thickness, width, lean meat content, width and length of the fingers, commercial needs of the belly market, etc. . . . This evaluation is usually done by trimmer operators or by new technologies such as automatic belly trimming process.

As described in the prior art except U.S. Pat. No. 6,336,856, the separation of the backfat and belly is done in the loin puller by one blade or by one or two of a set of dual blades. Consequently, this separation is done following a predetermined width which is always at the same distance of the scribe line whatever be the characteristics of the belly. Such may of-course substantially affect the yield of both products because the belly which has been separated from the backfat will have to be trimmed another time after evaluation of all the criteria described above and its yield will be lowered if the loin puller has removed from the belly too much fatback portion or not enough.

Thus, the backfat portions could be too narrow or too wide, thereby affecting the integrity and value of this product.

Of course, in the improved loin puller according to the invention, both of the blades have to be long enough to ensure that all the backfat of the loin be trimmed off.

Advantageously, two independent control systems may be used for adjusting the respective positions of the blades independently from each other. These control systems may be operated by an automatic measurement system which preferably comprises:

a roller mounted onto an arm that extends vertically over the conveying system so as to contact the loin close to the scribing line and thus permit to determine the thickness of the loin; or a laser beam that projects downwardly from the frame onto the loin close to the scribing line so as to determine the thickness of this loin; or an ultrasonic system that projects downwardly from the frame onto the loin close to the scribing line so as to determine the thickness of the loin.

To improve the cutting, use is preferably made of an L-shaped blade that has a vertical portion with a front cutting edge that extends at an angle downwardly rearwardly, and a horizontal position with a front cutting edge of triangular shape that extends frontwardly towards the loin that is moved by the conveying system. Advantageously, the cutting edge of the L-shaped blade may also be sharpened more on one side. In this connection, it has surprisingly been found that if use is made of an L-shaped blade having its cutting edge sharpened at an angle more on one side instead of having it sharpened evenly on both sides, much better engagement of the blade in the loin close to ribs may be achieved without hitting said ribs or any part of the shoulder blade that could still be in the piece of meat, especially when this piece is made of soft meat. Moreover, much better results may be obtained.

To improve the cutting and make easier the maintenance of the blades, use is preferably made also of an arcuate cutting blade that has a front groove in which is detachably inserted a foldable piece of metal having a front sharpened cutting edge. Such a piece may be replaced in a fast and easy manner whenever necessary.

Preferably, the L-shaped blade extends in front of the arcuate blade in order to cut part of the loin close to where it has been scribed, before the arcuate blade engages the loin. In this particular case, the arcuate blade that extends behind the L-shaped blade may have two opposite ends connected to the frame and be shaped so as to engage the loin and cut the backfat to be trimmed thereof between the side of the loin opposite the belly and the scribing line. Alternatively and preferably also, the arcuate blade that extends behind the L-shaped blade, has only one end connected to the frame, and another free end that extends close to the L-shaped blade.

In accordance with a particularly preferred embodiment of the invention:
 the L-shaped blade extends upstream of the arcuate blade in order to cut part of the loin close to where it has been scribed, before the arcuate blade engages said loin;
 the arcuate blade that extends behind the L-shaped blade, has one end connected to the frame and another end that is free and extends close to the L-shaped blade;
 the free end of the arcuate blade is pivotably connected to a pin that projects horizontally rearwardly from the L-shaped blade; and
 the arcuate blade is flexible and the L-shaped blade is rigid.

With this particular embodiment, respective adjustments of the arcuate blade and of the L-shaped blade by their respective control systems permit to modify the arcuate shape of the arcuate blade and thus to adapt its cutting to the loin to be trimmed off, thereby reducing the risk of scoring the loin portion.

The invention and its advantages will be better understood upon reading the following non-restrictive description of a preferred embodiment thereof made with reference to the accompanying drawings.

DETAILED DESCRIPTION OF THE INVENTION

Figure 2:
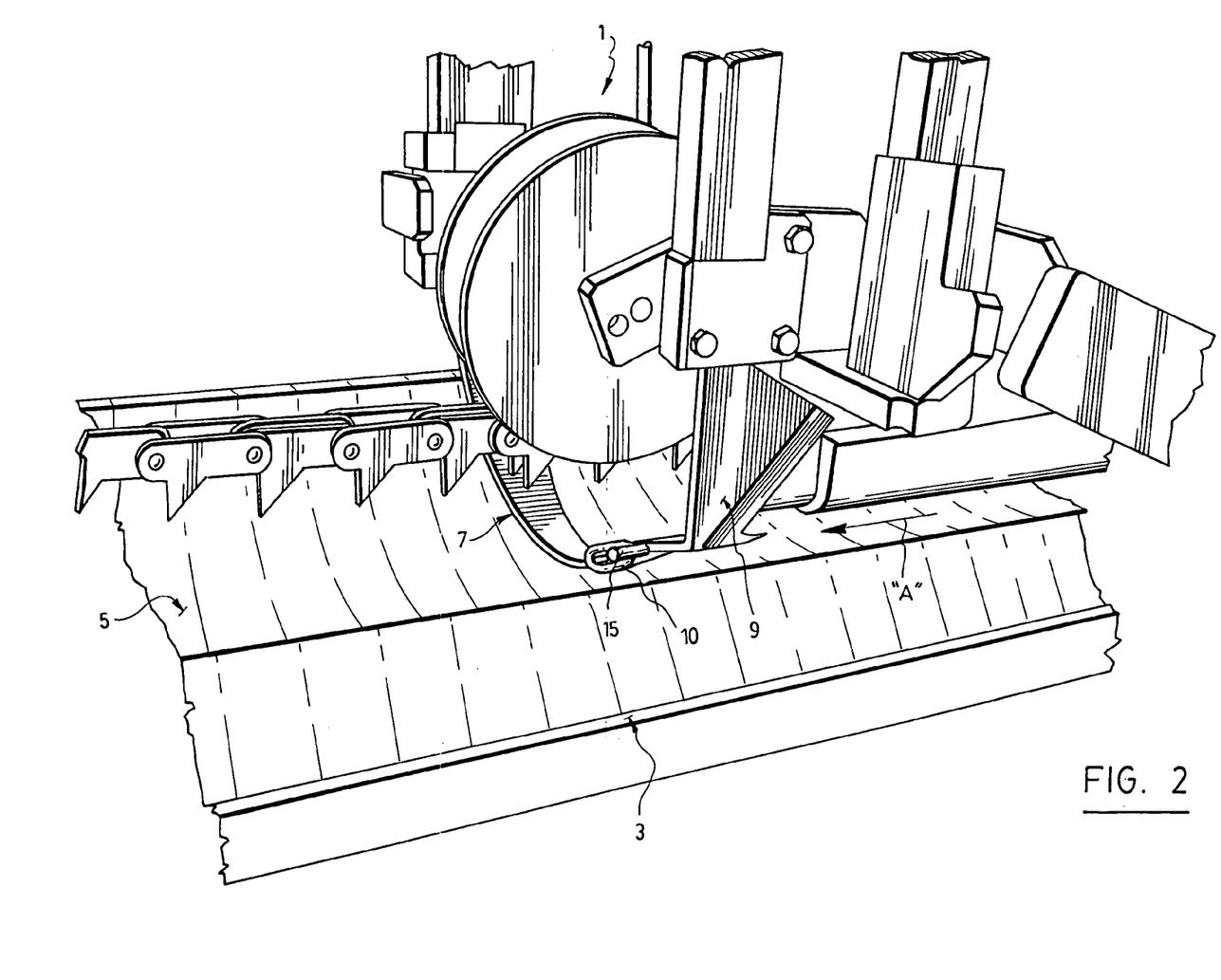
FIG. 2 is a rear, left-hand side perspective view of the cutting zone of an improved loin puller according to a preferred embodiment of the invention.
Figure 3A:
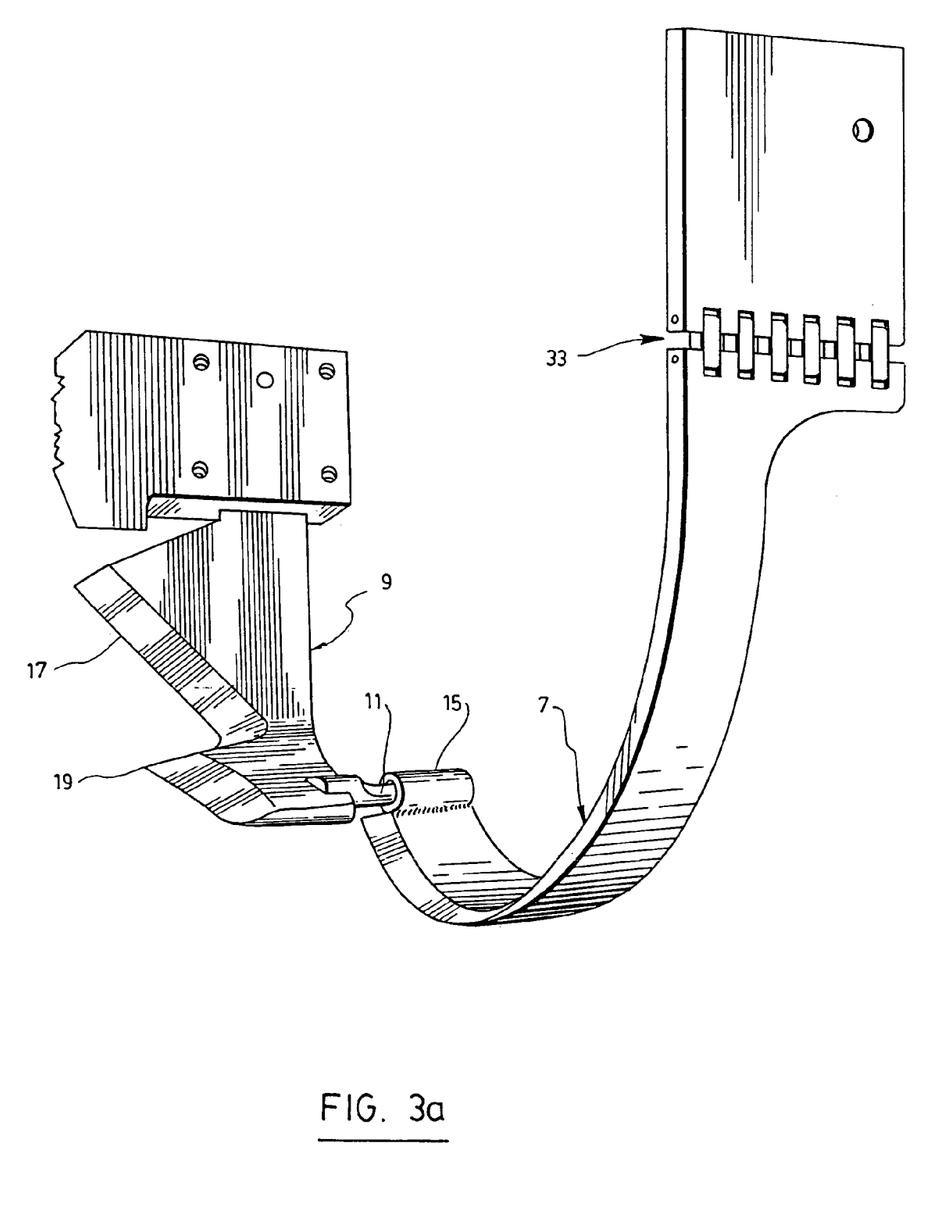
FIG. 3a is a front right-hand side perspective view of the two blades of the cutting tool of an improved loin puller according to another preferred embodiment of the invention, wherein the arcuate blade of the cutting tool is pivotably connected to the frame by means of a double hinge link.
Figure 3B:
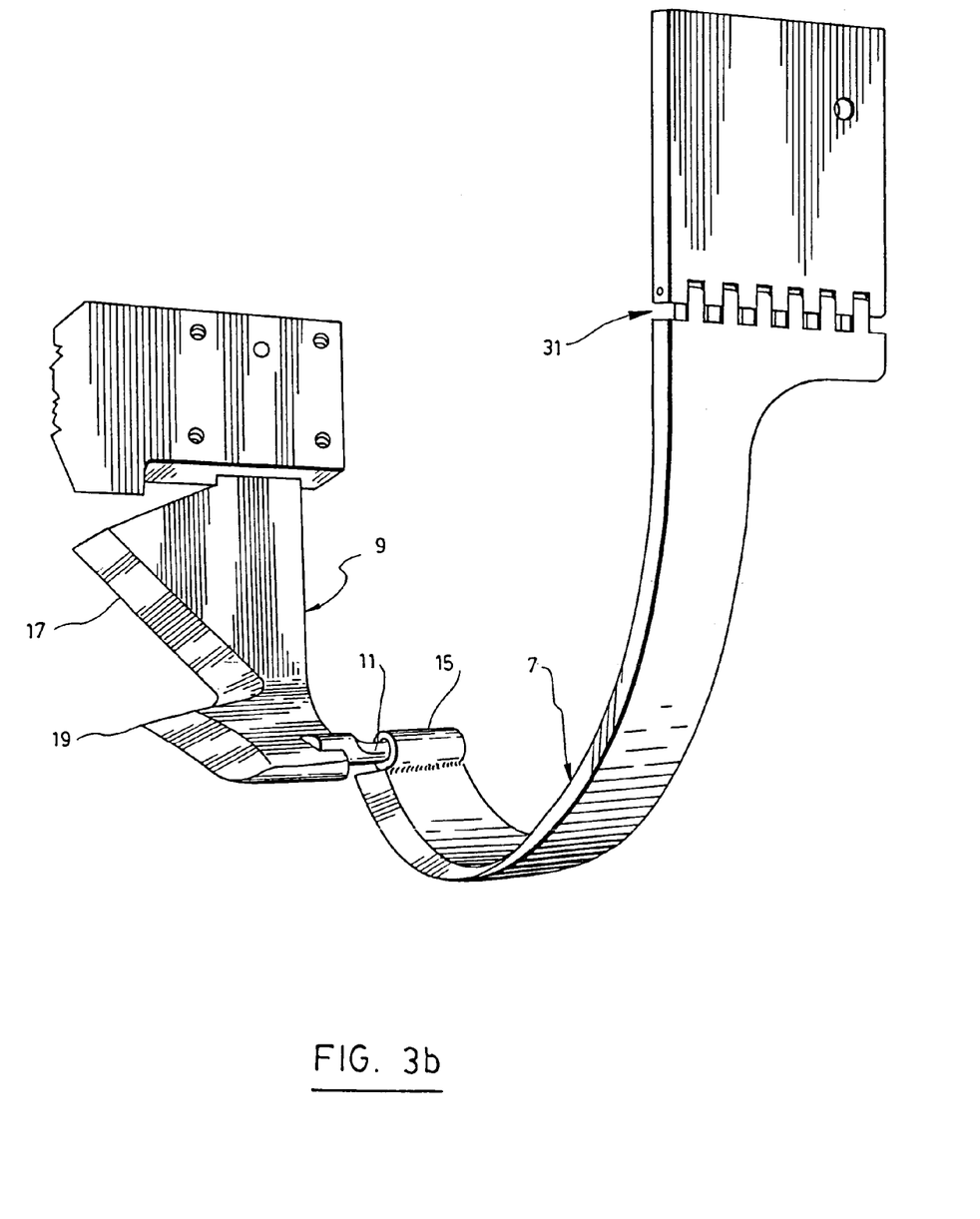
FIG. 3b is a view similar to FIG. 3a but wherein the arcuate blade of the cutting tool is pivotably connected to the frame by a single hinge link.
Figure 4:
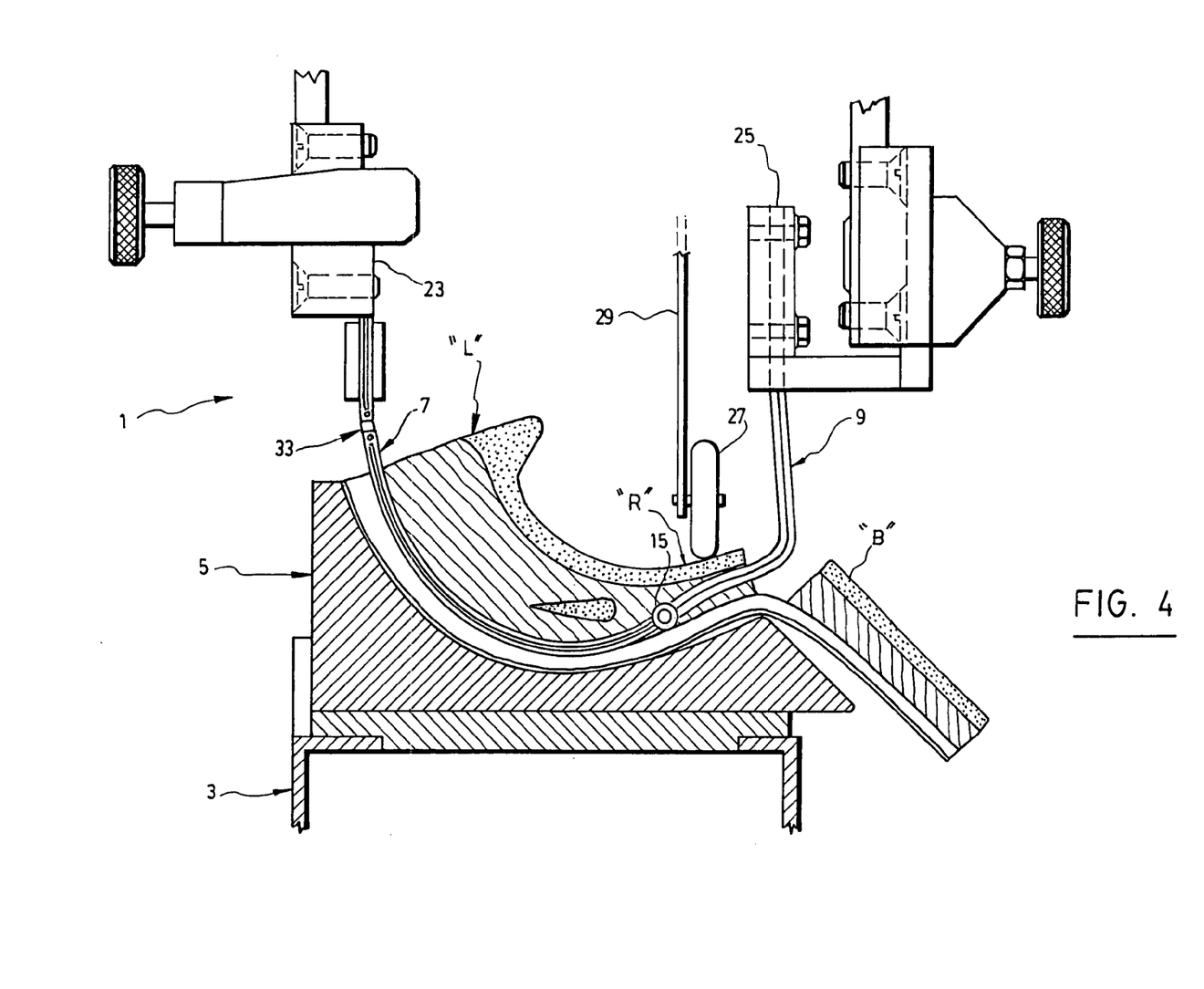
FIG. 4 is a rear view of the cutting zone of the improved loin puller shown in FIG. 3a, illustrating the respective positions of the blades of the cutting tool, when these blades engage the loin and belly.
Figure 5:
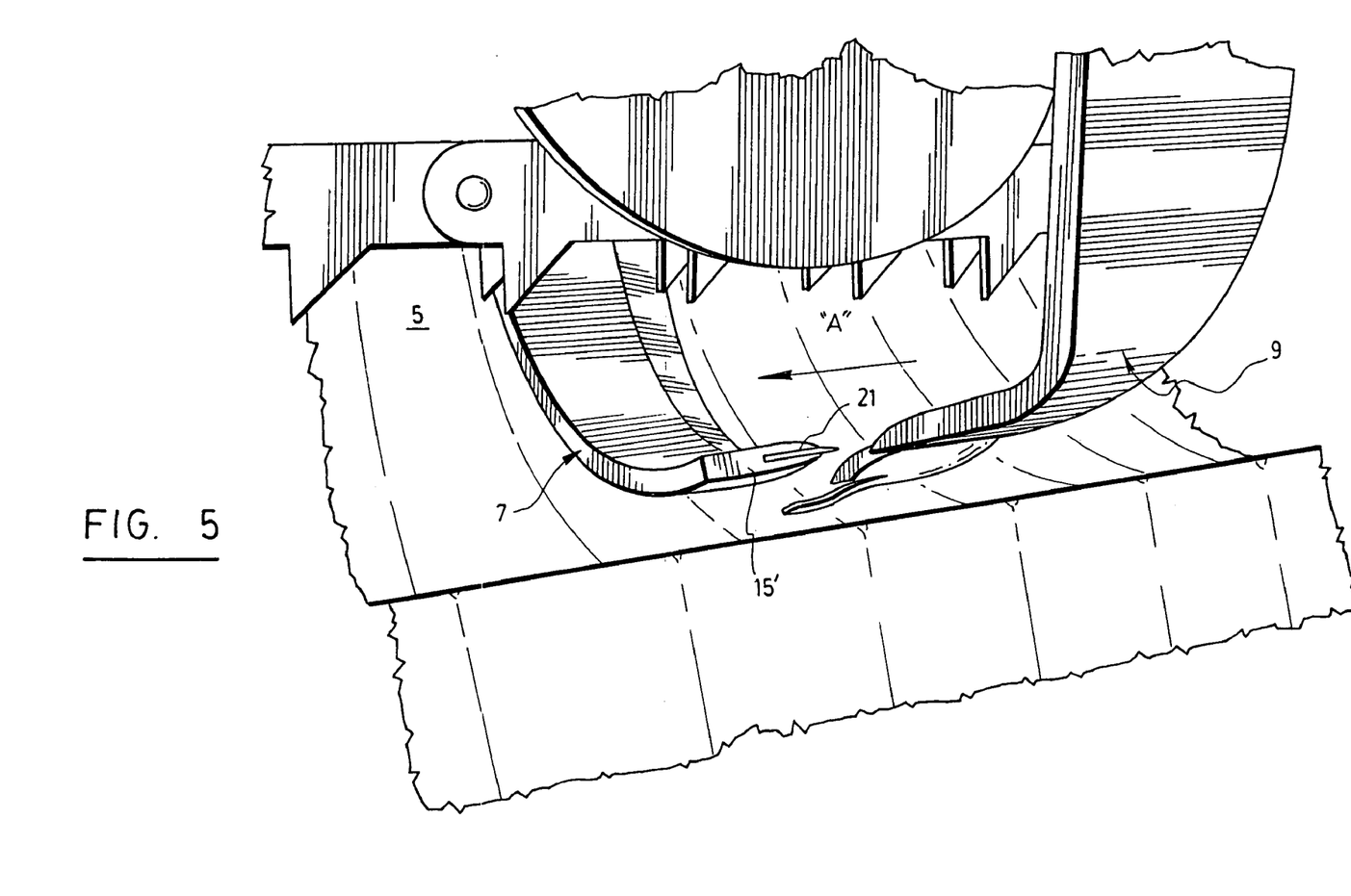
FIG. 5 is a rear, left-hand side perspective view of the cutting zone of an improved loin puller according to a further preferred embodiment of the invention.
Figure 6:
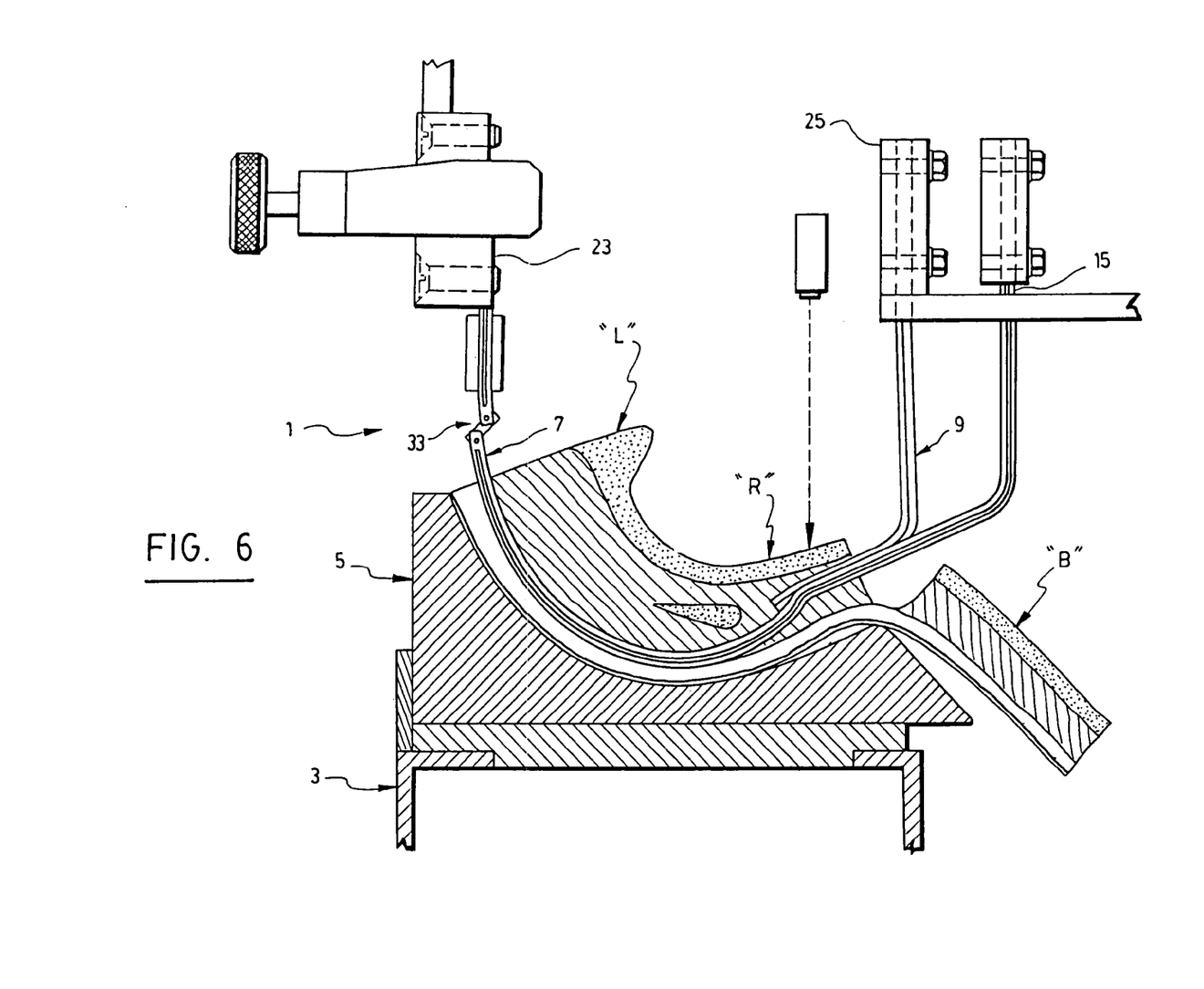
FIG. 6 is a rear view similar to the one shown in FIG. 4, illustrating still another preferred embodiment of the invention.
Figure 7A:
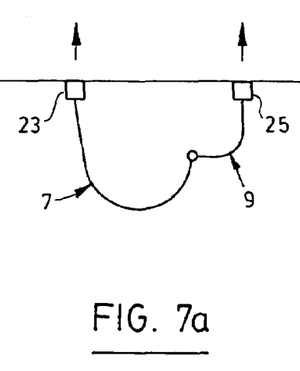
FIGS. 7a to 7f are schematic rear views of the blades of the improved loin puller shown in FIGS. 3 and 4, which Figures illustrate the distortions that can be given to the arcuate blade of the loin puller when this blade is flexible and operatively connected to the L-shaped blade which is rigid.
Figure 7B:
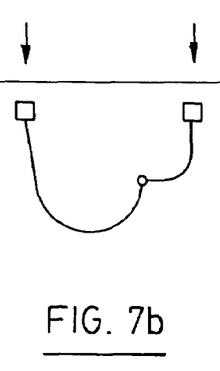
Figure 7C:
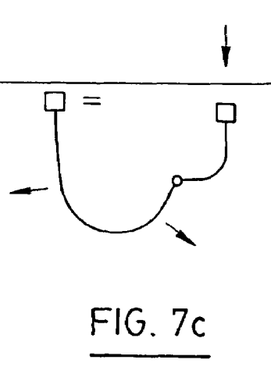
Figure 7D:
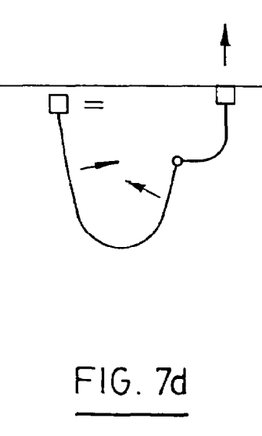
Figure 7E:
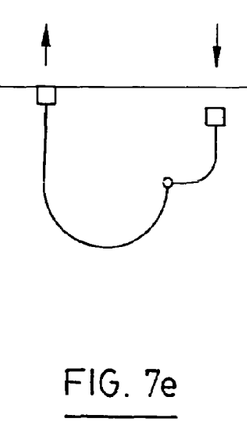
Figure 7F:
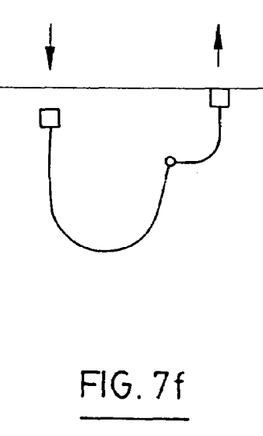

The improved loin puller 1 according to the different preferred embodiments of the invention as shown in FIGS. 2 to 6, is devised for trimming off the fat and skin viz. the "backfat", from the back of a loin "L" scribed from a belly "B", as shown in FIG. 1. This improved loin puller 1 basically comprises:
 a frame 3;
 a conveying system 5 mounted onto the frame for engaging the loin and moving it towards a cutting zone in the direction shown by the arrow "A" in the drawings; and
 a cutting tool mounted onto the frame 3 in the cutting zone for engaging the loin when the same is moved by the conveying system 5 and for cutting the backfat to be trimmed off from the same with the so cut backfat still remaining attached to the adjacent part of the belly, as is shown in FIGS. 4 and 6

As aforesaid, the improvement essentially lies in that the cutting tool comprises two blades 7 and 9. One of these blades, namely the one numbered 7, is arcuate and positioned onto the frame 3 so as to engage at least one part of the loin "L" from the side of the loin that is opposite to the belly "B" and to cut backfat to be trimmed off from this part. This arcuate blade 7 has at least one of its ends pivotably connected to the frame 3 by means of a joint which can be a single hinge link 31 as shown in FIG. 3b or a double hinge link 33 as shown in FIGS. 3a, 4 and 6.

The other one of the blades, namely the one numbered 9, is L-shaped and positioned onto the frame, so as to engage another part of the loin "L" and cut the backfat to be trimmed thereof directly from the scribing line just below the back ribs "R" of the loin (see FIGS. 4 and 6).

Of course, both of the blades (7, 9) must be long enough so as to ensure that, as a result of the cuts, they respectively make in the loin "L" all the backfat of the loin be trimmed off.

In accordance with a particularly preferred embodiment of the invention shown in FIGS. 4 and 6, two independent systems 23, 25 may be used for adjusting the respective positions of the arcuate blade 7 and of the L-shaped blade 9 independently from each other. These two control systems 23, 25 can be operated by an automatic measurement system, as is of common practice in the existing automatic loin pullers (see again the U.S. patents cited in the "Background of the invention"). As automatic measurement system, use can be made of a system as shown in FIG. 4, which comprises a roller 27 mounted onto an arm 29 that extends vertically over the conveying system 5 so as to contact the loin close to the scribing line and thus permit to determine the thickness of this loin. Alternatively, use can be made of a system as shown in FIG. 6, which comprises a laser beam or an ultrasonic system that projects downwardly from the frame onto the loin close to the scribing line so as to determine the thickness of the loin.

In the preferred embodiments shown in FIGS. 2 to 6, the L-shaped blade 9 extends upstream of the arcuate blade 7 in order to cut the loin close to where it has been scribed, before the arcuate blade 7 engages the loin and complete full cutting of the same. It is worth noting however that the blades 7 and 9 could alternatively extend both in a same plane transversal to the conveying system, if such is desired.

As shown in FIG. 6, the arcuate blade 7 that extends behind the L-shaped blade 9 may have two opposite ends 13, 15 that are both connected to the frame. In this particular embodiment, the arcuate blade 7 must of course be shaped so as to engage the loin and cut the backfat to be trimmed thereof from the side of the loin that is opposite the belly up to the scribing line.

Alternatively, as shown in FIGS. 2 to 5, the arcuate blade 7 that extends behind the L-shaped blade 9 may have only one of its ends 13 connected to the frame and the other end 15 that remains free and extends close to the L-shaped blade 7. In such a case, the two blades 7 and 9 can be completely separate from each other as shown in FIG. 5 or alternatively and preferably, they can be connected to each other:
  either by means of a ring 10 to form a slide, as is shown in FIG. 2;
  or by means of a joint of conventional structure, like a string or a swivel;
  or even more preferably, by means of a pivot 11 that projects rearwardly from the L-shaped blade 9, and in which is pivotably inserted the end of the arcuate blade, as is shown in FIGS. 3 and 4.

Such a connection of the free end of the arcuate blade 7 to the L-shaped blade 9, is particularly interesting in that it makes it possible for the arcuate blade 7 to be made of a flexible material and be operatively connected to the L-shaped blade 9 that is then made of a rigid material. In this particular embodiment, respective adjustments of the arcuate blade and of the L-shaped blade by their own control systems permit to modify the arcuate shape of the arcuate blade and thus to adapt its cutting to the loin to be trimmed off. Such is illustrated in FIGS. 7a to 7f, which show the particular portions of both blades and the curvature of the arcuate blade 7 as a function of the positions of their control systems 23, 25. In these figures, some of the arrows show the motions given to both of the control systems, up, down or stationary (=). Other arrows show the way the arcuate blade 7 is flexed as a function of the motions of the control systems.

In all cases, it is essential that the arcuate blade 7 has one of its ends pivotably connected to the frame by means of a joint 31, 33 whose purpose is to give to the blade 7 more flexibility and facilitate its adjustment by the above-mentioned control systems 23, 25. The joint can be a conventional single hinge joint 31 as shown in FIG. 3b. Use should however be preferably made of a double hinge joint 33 comprising a link having one end pivotably connected to the frame either directly or via the control system 23 and another end pivotably connected to the adjacent end the arcuate blade 7, as is shown in FIGS. 3a, 4 and 6.

As may thus be noticed, the improved loin puller according to the invention permits to process loins of any size and/or fatness with a maximum efficiency to properly separate the backfat thereof whatever be the thickness of such a backfat, while substantially reducing the risk of the scoring portions of the loin without separating the backfat from the belly.

As is better shown in FIG. 3, the L-shaped blade 9 preferably has a vertical portion with a front cutting edge 17 that extends at an angle downwardly rearwardly, and a horizontal portion with a front cutting edge 19 of triangular shape that extends frontwardly towards the loin that is moved by the conveying system.

Advantageously, the cutting edges 17, 19 of the L-shaped blade 9 may be sharpened more on one side instead of being sharpened evenly-on both sides like any conventional knife or blade. This "double" arrangement in the shape and sharpening of the cutting edges 17, 19 of the cutting blade 9 permits to engage the loin close to the ribs "R" in a more efficient way while substantially reducing the risk of hitting the ribs or any part of the shoulder blade that would still be in the piece of meat. Indeed, as soon as the first rib "R" is lifted up by the cutting edges of the cutting blade 9 that is sharpened more on one side, the other ribs which are connected to the first one and to each other by pieces of meat will also be lifted up in a smooth manner, thereby reducing the risk of breaking and tearing.

Preferably also, the arcuate blade 7 may have a front groove in which is detachably inserted a foldable piece of metal 21 having a front sharpened cutting edge, as shown in FIG. 5. Such makes the maintenance of the loin puller much easier to assume as one may easily replace the foldable piece of metal 21 of the blade 7 by another new one.

Tests have been carried out by the Applicant on an improved loin puller as shown in FIGS. 3 and 4, wherein the arcuate blade 7 was flexible and had a free end pivotably connected to a pin 11 projecting rearwardly from the L-shaped blade 9. These tests have proved to be particularly efficient and have clearly demonstrated the advantage of using two separate cutting blades as disclosed hereinabove, instead of using only one blade, in terms of efficiency, cost and results.

With the improved loin puller according to the invention, better cutting of the loin may easily be achieved. In addition to a better cutting, other advantages are also achieved, such as easier installation, replacement and maintenance of each blade, especially when each blade has one end only connected to the frame.

Of course, numerous modifications could be made to the improved loin puller according to the preferred embodiments of the invention as disclosed hereinabove without departing from the scope of the invention as claimed hereinafter, it being understood that all the other structural features of the loin puller as such are conventional and needs not be further described.

The invention claimed is:

1. A loin puller for trimming off the backfat of a loin that has been scribed from a belly along a scribing line, the loin comprising backribs adjacent to the scribing line, said loin puller comprising:
  a frame;
  a conveying system mounted onto the frame for engaging the loin and moving it towards a cutting zone; and
  a cutting tool mounted onto the frame in the cutting zone for engaging the loin when said loin is moved by the conveying system and for cutting the backfat to be trimmed off from said loin with the so-cut backfat remaining attached to the belly,
wherein said cutting tool comprises two blades, one of said blades being arcuate and positioned onto the frame so as to engage at least one part of the loin from a side of said loin opposite to the belly and to cut the backfat to be trimmed from said one part, the other one of said blades being L-shaped and positioned onto the frame so as to engage another part of the loin and cut the backfat to be trimmed thereof directly from the scribing line just below the back ribs of said loin, both of said blades being long enough so as to ensure that all the backfat of the loin be trimmed off; and wherein said arcuate blade has one end pivotally attached to the frame by a joint and another opposite end attached either to the frame or to the L-shaped blade.

2. The loin puller of claim 1, wherein the joint used to attach the one end of the arcuate blade to the frame is a double hinge joint comprising a link having ends pivotably connected to the frame and to the arcuate blade, respectively.

3. The loin puller of claim 2, wherein the L-shaped blade extends in front of the arcuate blade in order to cut part of the loin close to where it has been scribed, before the arcuate blade engages said loin.

4. The loin puller of claim 3, wherein the arcuate blade that extends behind the L-shaped blade, has both of its ends connected to the frame and is shaped so as to engage the loin and cut the backfat to be trimmed thereof between the side of said loin opposite to the belly and the scribing line.

5. The loin puller of claim 4, further comprising two independent control systems for adjusting the respective positions of the blades independently from each other by an automatic measurement system devised to determine the thickness of the loin.

6. The loin puller of claim 5, wherein the L-shaped blade has a vertical portion with a front cutting edge that extends at an angle downwardly rearwardly, and a horizontal portion with a front cutting edge of triangular shape that extends frontwardly towards the loin that is moved by the conveying system.

7. The loin puller of claim 5, wherein the arcuate cutting blade has a front groove in which is detachably inserted a foldable piece of metal having a front sharpened cutting edge.

8. The loin puller of claim 3, wherein the arcuate blade that extends behind the L-shaped blade, has one end connected to the frame and another end connected to the L-shaped blade.

9. The loin puller of claim 8, wherein the other end of the arcuate blade is connected to the L-shaped blade by a joint.

10. The loin puller of claim 8, wherein the other end of the arcuate blade is slideably connected to the L-shaped blade.

11. The loin puller of claim 8, wherein the other end of the arcuate blade is pivotably connected to the L-shaped blade by means of a pin that projects horizontally rearwardly from the L-shaped blade.

12. The loin puller of claim 11, wherein the arcuate blade is flexible and the L-shaped blade is rigid.

13. The loin puller of claim 8, further comprising two independent control systems for adjusting the respective positions of the blades independently from each other by an automatic measurement system devised to determine the thickness of the loin.

14. The loin puller of claim 13, wherein the L-shaped blade has a vertical portion with a front cutting edge that extends at an angle downwardly rearwardly, and a horizontal portion with a front cutting edge of triangular shape that extends frontwardly towards the loin that is moved by the conveying system.

15. The loin puller of claim 13, wherein the arcuate cutting blade has a front groove in which is detachably inserted a foldable piece of metal having a front sharpened cutting edge.

16. The loin puller of claim 2, further comprising two independent control systems for adjusting the respective positions of the blades independently from each other by an automatic measurement system devised to determine the thickness of the loin.

17. The loin puller of claim 2, wherein the L-shaped blade has a vertical portion with a front cutting edge that extends at an angle downwardly rearwardly, and a horizontal portion with a front cutting edge of triangular shape that extends frontwardly towards the loin that is moved by the conveying system.

18. The loin puller of claim 2, wherein the arcuate cutting blade has a front groove in which is detachably inserted a foldable piece of metal having a front sharpened cutting edge.

* * * * *